United States Patent [19]
Aitken et al.

[11] 3,819,056
[45] June 25, 1974

[54] MEMBRANE ASSEMBLIES FOR REVERSE OSMOSIS APPARATUS

[75] Inventors: Ian Donald Aitken, Sidcot; Ronald Gayler, Wantage; John Roger Grover, Reading; Raymond Anthony Philip Spencer, Abingdon, all of England

[73] Assignee: United Kingdom Atomic Energy Authority, London, England

[22] Filed: Oct. 10, 1972

[21] Appl. No.: 295,944

Related U.S. Application Data

[63] Continuation of Ser. No. 105,423, Jan. 11, 1971, abandoned.

[30] Foreign Application Priority Data
Jan. 14, 1970   Great Britain ................. 1904/70

[52] U.S. Cl. .............................. 210/321, 210/500
[51] Int. Cl. .......................................... B01d 31/00
[58] Field of Search ............ 210/23, 321, 489, 490, 210/500

[56] References Cited

UNITED STATES PATENTS

| | | | |
|---|---|---|---|
| 2,864,506 | 12/1958 | Hiskey | 210/321 |
| 3,246,764 | 4/1966 | McCormack | 210/321 |
| 3,498,909 | 3/1970 | Littman | 210/23 |
| 3,563,889 | 2/1971 | Cooper et al. | 210/490 X |
| 3,578,175 | 5/1971 | Mahjikian | 210/489 |
| 3,612,282 | 10/1971 | Cheng | 210/500 X |

FOREIGN PATENTS OR APPLICATIONS
846,457   8/1960   Great Britain ................. 210/497.1

*Primary Examiner*—Frank A. Spear, Jr.
*Attorney, Agent, or Firm*—Larson, Taylor & Hinds

[57] ABSTRACT

The membrane assembly comprises a grooved rod covered with a permeable sheath upon which is deposited a reverse osmosis membrane.

8 Claims, 7 Drawing Figures

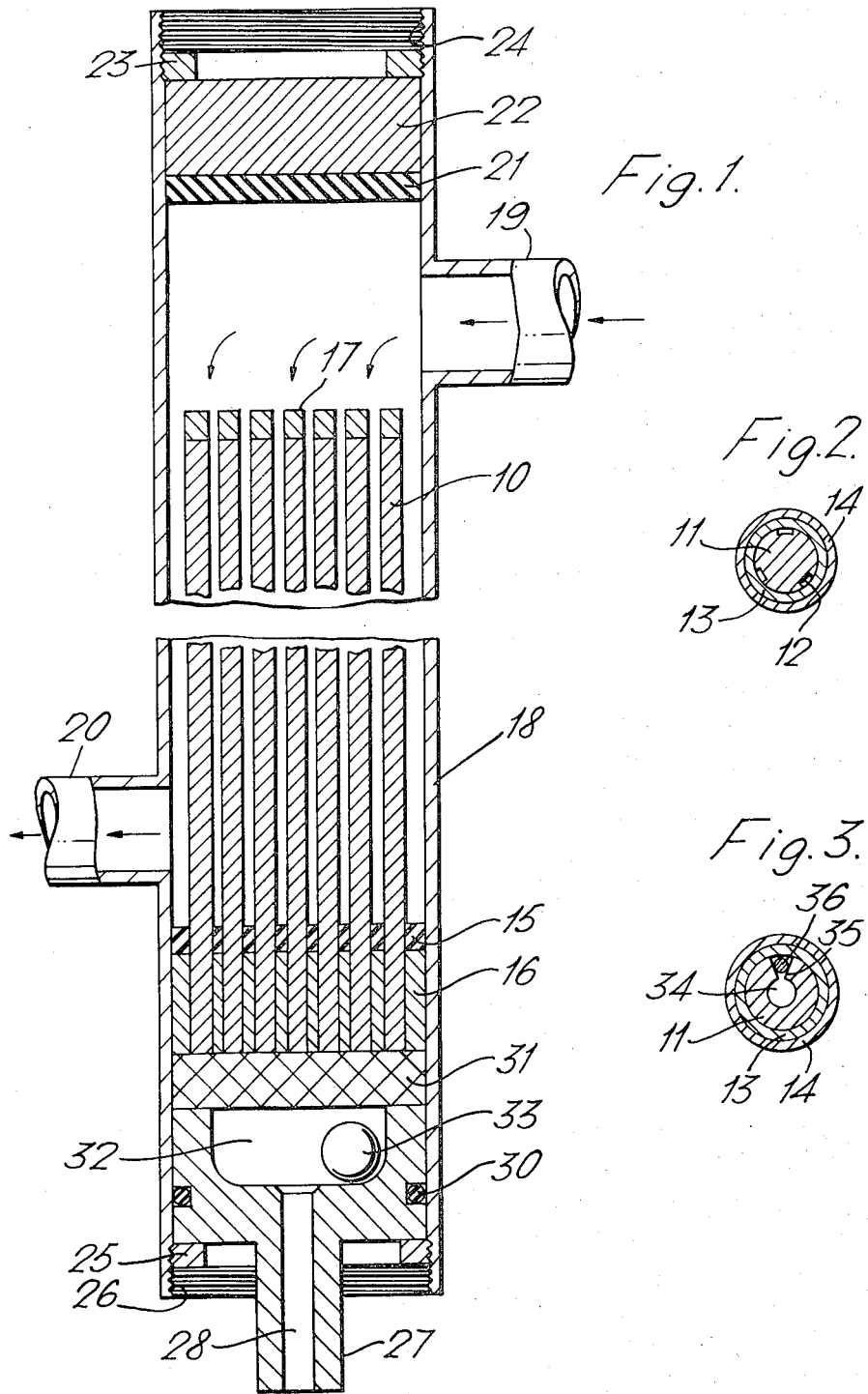

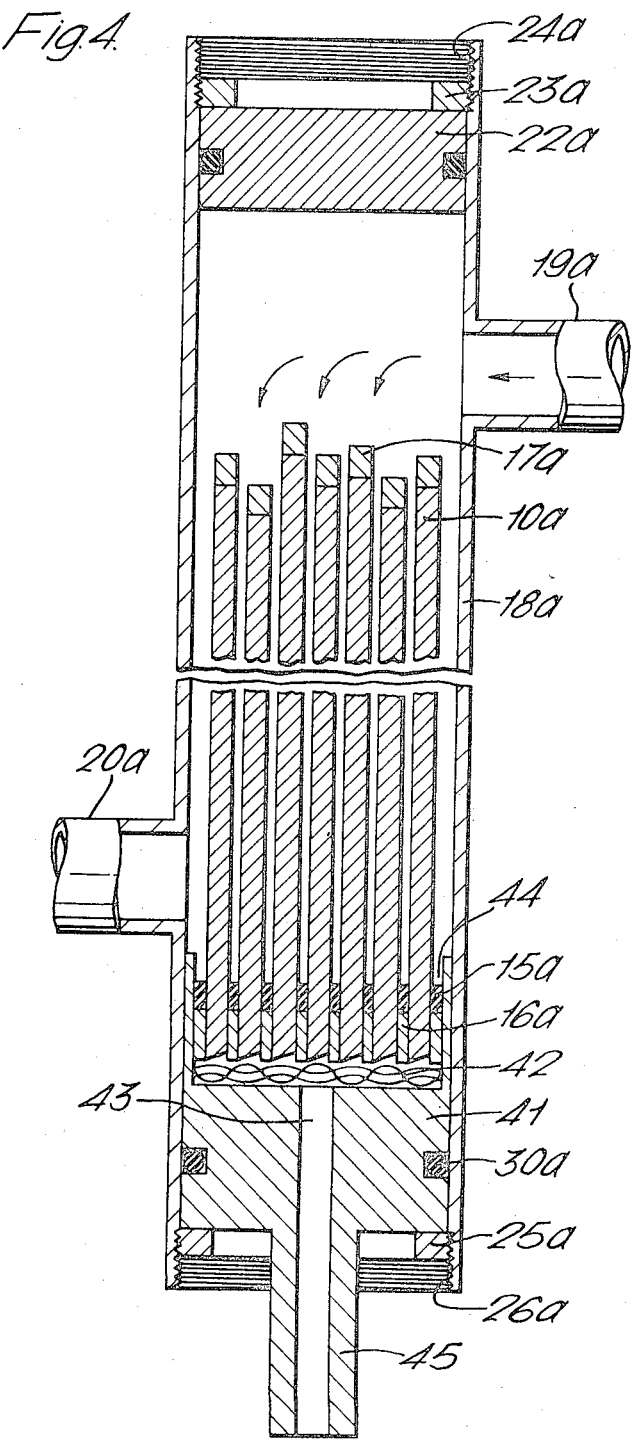

MEMBRANE ASSEMBLIES FOR REVERSE OSMOSIS APPARATUS

This is a continuation, of application Ser. No. 105,423 filed Jan. 11, 1971, now abandoned.

BACKGROUND OF THE INVENTION

The present invention relates to membrane assemblies for reverse osmosis apparatus.

It is known that reverse osmosis apparatus comprises in essentials a semi-permeable membrane which is supported against a suitable permeable substrate and is contacted on the side remote from such substrate by the liquid that is to be purified. The liquid is a solution containing solute ions dispersed in a solvent which in practice is normally water.

The function of a semi-permeable membrane is to permit the passage of solvent, but not of solute, and in normal osmosis the solvent will pass through the semi-permeable membrane from one side to the other until the concentrations of solute are the same on both sides. If the flow of solvent is restrained a pressure is generated equal to the osmotic pressure of the solution. In reverse osmosis this osmotic pressure is exceeded by a reverse pressure so that solvent is forced through the semi-permeable membrane from the solution to the other side of the membrane, i.e. towards the substrate. In practice most of the semi-permeable membranes which are suitable for use in reverse osmosis have unidirectional properties.

In addition to the apparatus described above, it is normally necessary to provide some means for collecting the product and for submitting the solution to the high pressure that is necessary.

SUMMARY OF THE INVENTION

According to the present invention there is provided a membrane assembly for reverse osmosis apparatus, which assembly comprises a rod having at least one longitudinally extending groove therein, a permeable substrate in the form of a sleeve covering the rod, a reverse osmosis membrane deposited on the permeable substrate, there being an opening providing for direct communication with the groove.

Preferably the groove extends to at least one end of the rod, thereby to provide the said opening at the end of the rod.

Very desirably, at the end of the rod remote from that at which the groove reaches the end of the rod, the rod, substrate and membrane are sealed together. In this way the product or permeate passing through the membrane is collected by the permeable substrate and channelled into the groove to flow along the groove and emerge at the said one end of the rod.

Although metal rods could be used, we prefer to use rods of a plastics material and preferably of polypropylene or an unplasticised grade of polyvinyl chloride. A convenient length of rod is 8 feet (2.44 metres) and a convenient diameter is ⅛ inch (0.318 cms). Such a rod can be made by continuous extrusion using conventional extrusion materials and machinery, and the grooves can be made either during the extrusion process or by machining subsequent to extrusion. It should be explained that the grooves do not need to be straight although this is convenient and indeed preferable. A convenient size of groove for an arrangement as above described is a groove of square section and 0.020 inches (0.051 cm) deep and 0.020 inches (0.051 cm) wide. Three such grooves are conveniently provided on each rod and calculations show that they will permit the flow of all the permeate that is expected to flow through such a membrane assembly. However, in one arrangement three larger grooves 0.030 inches (0.076 cm) deep and 0.030 inches (0.076 cm) wide have been employed. In yet another arrangement six grooves 0.020 inches (0.051 cm) deep and 0.020 inches (0.051 cm) wide have been employed.

Alternatively to providing a plurality of small grooves, a single large groove may be used. In one form this may be of keyhole section so that the rod could be considered as a tube with a slit therein communicating the surface with the bore.

The most convenient form of substrate is a winding of thread and this thread does not of itself need to be permeable, the permeability of the substrate being provided by the gaps between the threads. Threads of glass fibre, polyester fibre, nylon or polypropylene are typical examples and we in practice prefer a polyester fibre. The threads may be applied to the rod by winding or braiding and, depending upon whether it is convenient to apply the threads immediately after the rod has been formed, the thread may be applied either directly or at a later stage. It is particularly convenient to apply the threads by a braiding machine operating directly following the output of the extrusion machine.

In the case of a single large groove, particularly a keyhole groove, part of the groove may be filled with a tape or strand of fibres to prevent the substrate penetrating into the groove.

Reverse osmosis membrane formulations are well known in the art, and essentially the preferred membrane formulations are of the type which comprise a mixture of cellulose acetate, a pore-forming substance and a solvent. Such a membrane dope may be applied to the rod as above described after the fibre substrate has been placed thereon by passing the rod through a nozzle located within an annular extrusion orifice through which the membrane dope is extruded to form a controlled thickness of dope on the rod. The choice of membrane formulation and fibre substrate should be such that the dope does not penetrate through the fibres of the porous substrate and enter the groove to cause blockage of the groove. After casting, it is conventional to allow the dope to cure for a short period of time in air and then pass it to a cooled leaching bath and then finally heat treat it in hot water. At some suitable stage the rod may be cut up into the required lengths if any of the above steps are carried out in a continuous manner. In practice we prefer to form the rods in a continuous extrusion machine and at the same time form the grooves thereon. At the exit from the extrusion machine a polyester braiding is applied by means of a braiding machine and the braided rod then passes to a continuous casting bath and leaves the bath to dry for a short period of time and then pass continuously into the cold leaching bath. At an appropriate stage, the continuous length of rod may be cut to the necessary lengths. The rod is heat treated and this may be carried out either before or after cutting.

Various mounting devices are possible, but we prefer to use an arrangement wherein 19, 37, 61 or 91 rods as above described, each 8 ft long, are contained within a single pressure shell. In order to mount the rods, one end is pushed through a moulded seal of elastomeric material such as rubber having the appropriate number of channels therein, and then located in a locating disc which matches the rubber seal in design.

Alternatively the rods are located with their ends extending through channels in a locating disc and a seal of elastomeric material is moulded around the rods in situ, the elastomeric material penetrating into the spaces between the rods and the locating disc. In a further alternative arrangement, the rods are located with their ends extending through channels in a locating disc which is integrally provided with sealing means for effecting a seal between each rod and the locating disc.

Preferably an end fitting is provided comprising a cylindrical member having a first bore in which is received the combination of rods, locating disc and moulded rubber seal sealingly engaging the wall of the bore, which communicates with a second bore providing an outlet for product water, or other product liquid, from the assembly when in use in reverse osmosis apparatus.

Preferably the end fitting is provided with a thrust support member against which abut the ends of the rods, after appropriate trimming, the thrust support member being permeable or otherwise channelled to provide a passageway for product liquid to pass from where it emerges from the ends of the rods into the said outlet for product liquid.

The rods are thus firmly located by the locating disc and end thrust is absorbed by the thrust support. The rods themselves are sealed against the leakage of solution, e.g. brine, by means of the moulded rubber seal which deforms as necessary under pressure to give an adequate seal. However, the degree of deformation is not such as to close the grooves in the rod. The ends of the rods remote from the rubber seal are each individually sealed, for example by dipping in a suitable sealant. The rods may be dipped into polyvinyl alcohol and then into formalin, which polymerizes the polyvinyl alcohol and forms a seal.

Preferably the ends of the rods remote from the aforesaid rubber seal are each individually sealed by moulded end caps of elastomeric material, such as rubber, shaped to fit tightly over the ends of the rods over the top of the membrane and permeable support. With this arrangement, it is most desirable that the rods are cut to have a slight random difference in their lengths measured from the locating disc end. In this way, the possibility of the rubber end caps binding together and blocking the passage of feed brine is avoided or reduced.

It will be noted that the method of manufacture is such that the cutting of the rods into the 8 ft lengths may damage the membrane. This is not important, since the damaged portions are either located within the locating disc and thus at a position where they are not subject to the pressure of the brine, or alternatively they are sealed as above described.

A convenient form of pressure vessel comprises a tubular shell with side arms for the inflow and outflow of brine. At one end this tubular shell is closed by a resilient sealing disc, for example made of rubber, supported by a rigid, e.g. metal, blanking piece, which is conveniently held in position by an externally-threaded nut engaging an internal screw thread on the end of the shell. At the other end of the shell a similar nut is used to locate the end fitting in place. The end fitting is sealed to the shell by means of a pressure-resistant O-rings and supports the combination of rods, locating disc and moulded rubber seal, and thrust support member in position in the pressure vessel. The said second bore in the end fitting very desirably accommodates a ball valve which can seal against the exit passage. This ball valve is desirably made flow-sensitive so that in the event of one or more of the individual rods failing under pressure, the marked increase in flow causes the ball to move into the sealing position. In this way, should one of the rods fail, which would normally involve the passage of brine from the brine to the fresh water side of the apparatus, the ball will automatically move to seal off the exit and thus prevent contamination. At some convenient time it is then be possible to remove the failed module but it is not necessary to shut down the plant immediately upon failure.

BRIEF DESCRIPTION OF THE DRAWINGS

Specific constructions of membrane assembly embodying the invention will now be described by way of example and with reference to the accompanying drawings wherein:

FIG. 1 is a cross-section through part of a reverse osmosis apparatus,

FIG. 2 is a section at right angles through one of the rods shown in FIG. 1,

FIG. 3 is a view similar to FIG. 2 through an alternative rod,

FIG. 4 is a cross-section through part of another reverse osmosis apparatus,

DESCRIPTION OF PREFERRED EMBODIMENTS

Figure 5:
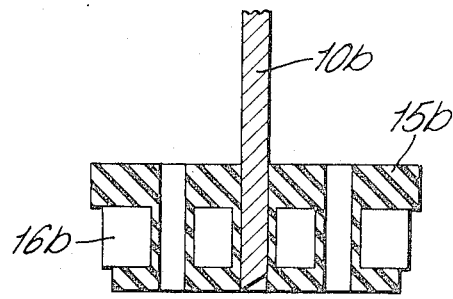
FIG. 5 is a fragmentary cross-section showing a modification to part of the apparatus of FIG. 4.

The apparatus shown in FIGS. 1 to 3 comprises a plurality of reverse osmosis rods 10, of which seven are shown in FIG. 1 and a section through one of them in FIG. 2. Each rod is in the form of an 8 ft long, ⅛ inch in diameter rod of plastics material 11 which in the preferred construction is polypropylene. This rod 11 is provided with three longitudinally extending grooves 12 of dimensions 0.020 inches square. Over the grooved rod 11 is a permeable substrate 13 which is in fact a braiding of polyester fibres. Over the substrate 13 is a semi-permeable membrane layer 14 derived from cellulose acetate in the known way.

After being made as above described in continuous lengths the rods 10 are cut into the 8 ft lengths required and then one end of each rod is pushed through a moulded rubber seal 15 which has the necessary apertures to receive the rods. The ends of the rods are then pushed through a locating disc 16 which is of apertured form similar to the moulded rubber seal. The effect of the locating disc 16 is to provide an adequate support for the ends of the rod.

If the rods protrude through the locating disc 16, the ends are trimmed, and it will be appreciated that any damage done in inserting the rods into the locating disc or in trimming the ends will be on the side of the seal 15 remote from the high pressure brine to be treated. The complete bundle of rods is now dipped at its other end in a sealing medium, for example polyvinyl alcohol, followed by a dip in formalin to polymerize and seal the ends of the rods remote from the locating disc. This sealing is shown diagrammatically at 17. It is, however, preferred to seal the ends of the rods at 17 with moulded rubber end caps which fit tightly over the ends of the rods over the top of the membrane and braiding. In this case, however, it is most desirable for the rods to be cut with differing lengths, as shown in FIG. 4. This avoids possible binding together of the rubber end caps and consequent blocking. The complete bundle as above described forms a replacement unit for insertion into the reverse osmosis apparatus if necessary.

As shown in FIG. 1, this reverse osmosis apparatus comprises a tubular shell 18 made of stainless steel or the like and of a sufficient thickness to withstand the pressure which must be applied in reverse osmosis. Adjacent each end is a side-limb 19, 20 for the inflow and outflow of the brine, and the arrangement is desirably such that the side-limb 19 is located above the sealed end 17 of the rods, whilst the side-limb 20 is located close to the seal 15. Above the side-limb 19 is a moulded rubber seal 21 which engages an end piece 22 held in position by an externally-threaded nut 23 engaging a screw thread 24 on the inside of the pressure shell 18.

At the other end of the pressure shell a similar screw-threaded nut 25 engages a screw thread 26 and holds in position an end cap 27 which is provided with an internal bore 28 for the outflow of the product fresh water. This end cap 27 is sealed to the pressure shell 18 by means of an O-ring 30, and its inner end engages against a porous support member 31 made of sintered metal or the like which in turn engages against the end of the locating disc 16. The function of the porous support is to provide a channel for the product fresh water from the substrate 13 on each of the rods to convey the same to the channel 28. The support 31 together with the end cap 27 also absorbs the end load on the rods due to the pressure of the brine within the pressure shell 18.

The inner end of the end cap 27 is recessed as shown at 32 to accommodate a ball 33 functioning as a ball valve. In normal operation the ball 33 is located as shown. However, should the membrane on any of the rods become defective and fail, the flow of water through the apparatus will increase very markedly, for example by a factor of 10, and since the ball 33 is located so as to be flow-sensitive, it will be moved from the position shown to seal the exit from the end cap 27 and thus cut off all flow from the module. This has the advantage that in the case of failure it is not necessary to shut down the plant, since the failed module automatically shuts itself down and can be withdrawn at some convenient time when the plant is shut down for maintenance or the like. The O-ring 30 is necessary because under failure conditions the high pressure brine may be in contact with the end cap 27.

The alternative form of rod shown in FIG. 3 has a single keyhole shaped groove and is conveniently described as a ⅛ inch diameter rod 11 having a 1/16 inch axial bore 34 with a V-slot 35 communicating the bore with the surface. In this V-slot is located a woven or braided strand of fibres 36 designed to permit the passage of water but prevent the deformation of the substrate 13 into the groove.

With the 37-rod configuration, the internal diameter of the shell 18 should be about 1½ inches. The output using 8 ft long rods is about 200 g.p.d. With the 91 rod configuration, the internal diameter of the shell 18 should be about 2½ inches. The output using 26 ft long rods can approach 1000 g.p.d.

FIG. 4 illustrates a modification of the reverse osmosis apparatus shown in FIG. 1. Similar components are referenced with the same numerals, but are distinguished by the suffix $a$.

The principal difference is the construction of the end fitting 41 which is cylindrical and adapted to fit snugly in the end of the shell 18$a$. The end fitting 41 is secured (25$a$, 26$a$) and sealed (30$a$) in the same manner as the end cap 27 of FIG. 1.

However, the end fitting 41 is provided with intercommunicating bores 43 and 44. The bore 44 is larger than the bore 43, extends from one end of the end fitting 41, and receives the locating disc 16$a$ and moulded rubber seal 15$a$ together with the rods 10$a$. The moulded rubber seal 15$a$ fits tightly against the wall of the bore 44 thus effecting a seal and serving to hold the rods securely attached to end fitting 41.

Disposed between the locating disc 16$a$ and the shoulder formed at the join between bore 44 and smaller bore 43 is a wire mesh 42. This mesh 42 serves as a thrust support member, in this example, both for the locating disc as a whole and for the individual rods. The mesh 42 is also permeable thus permitting product liquid from the rods to flow into the bore 43, which extends into an outlet pipe 45 as shown.

As described above, it is preferred to seal the ends 17$a$ of the rods 10$a$, remote from the end fitting 41, with tightly fitting moulded rubber end caps. The consequently desirable cutting to random rod lengths is illustrated.

FIG. 5 illustrates a modification to part of the end fitting. In this arrangement, the rods 10$b$ (only one of which is shown) are positioned in a locating disc 16$b$ which has oversized holes. A rubber seal 15$b$ is then moulded around the rods and locating disc in situ. This reduces the problem of accurate registration when fitting together rods, locating disc and rubber seal.

Figure 6:
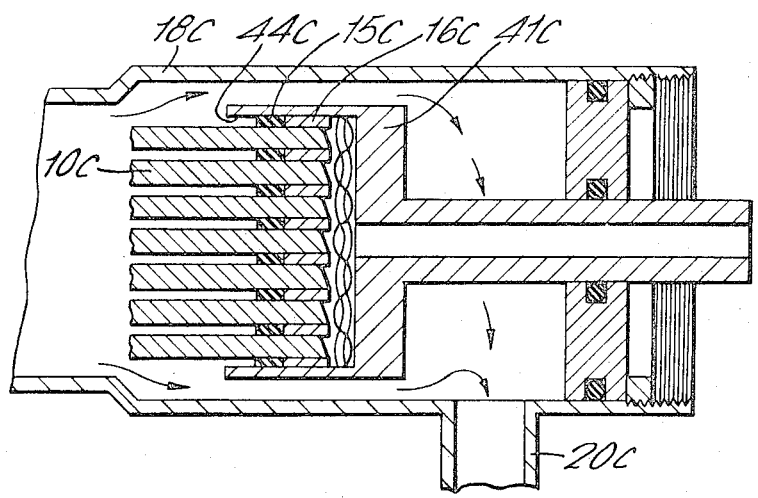
FIG. 6 is a cross-section through part of another reverse osmosis apparatus.

FIG. 6 illustrates a modification of the lower end portion (as seen in FIG. 4) of the apparatus. In FIG. 6 similar components to those shown in FIG. 4 are marked with the same reference numerals distinguished by the suffix $c$. The difference resides in provision for flow of brine around the outside of that portion of the end fitting 41$c$ which supports the combination of rods 10$c$, locating disc 16$c$ and moulded rubber seal 15$c$. This involves a slight modification in the end sealing arrangement and re-location of the brine outlet limb 20$c$. This arrangement provides an improved flow characteristic with respect to the ends of the rods 10$c$.

Figure 7:
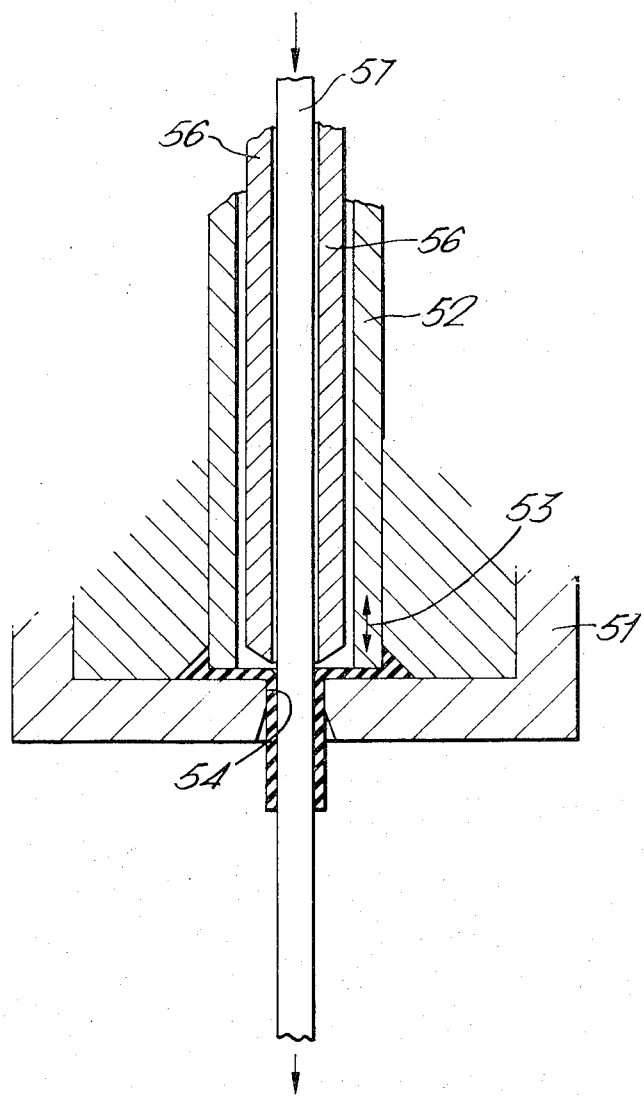
FIG. 7 illustrates apparatus employed for coating braided rod with membrane.

FIG. 7 illustrates diagrammatically a part of an apparatus for casting membrane onto braided rod of the configuration described above. This apparatus is particularly appropriate for casting membrane onto plastics material rod, and also forms the subject of another patent specification.

Referring to FIG. 7, there is shown part of a cylindrical vessel 51 which provides a reservoir for a membrane casting mixture. Coaxially located within the cylindrical vessel 51 is a hollow cylindrical sleeve 52. At the top (not shown) of the vessel 51, an external screw thread on the sleeve 52 engages an internal screw thread in the top of the vessel 51. Thus, by rotating the sleeve 52, its axial position can be adjusted as indicated by the arrow 53.

In the bottom of the vessel 51 there is provided an orifice 54, aligned with the axis of the vessel 51, and within the internal radius of the sleeve 52 so that flow of membrane casting mixture from the annular reservoir defined by the vessel 51 and sleeve 52 is controlled by the gap 55 between the bottom of the sleeve 52 and the bottom of the vessel 51. The gap 55 can be closed, and the reservoir thus shut off by screwing the sleeve 52 down into engagement with the bottom of the vessel 51.

Within the sleeve 52 are provided spring-loaded, self-centring guides 56. In this example, these guides are in the form of a three-armed pin vice spring-loaded inwardly.

A pipeline (not shown) is connected to the vessel 51 for supplying membrane casting mixture under pressure to the reservoir.

In operation, rod 57 to be membraned is fed through the guides 56 and orifice 54. The gap 55 and the pressure and temperature of the membrane casting mixture are adjusted in relation to the speed of feed of rod 57 to achieve a uniform coating upon the rod of the desired thickness whilst avoiding any tendency for the mixture to build up towards the guides 56.

The emerging coated rod is subjected to treatment appropriate to the membrane casting mixture. Thus, for example, with cellulose acetate membrane, the emerging rod is exposed to air over a short path and is then passed through a bath of cold water.

The arrangement of the apparatus of this example is particularly advantageous in that the reservoir may be shut off simply and effectively by closing the gap 55, without the need for removing the rod, which may be semi-continuously or even continuously supplied to the apparatus. Further, the effectiveness of the gap 55 in metering supply of membrane casting mixture permits the guides 56 to be positioned close to the orifice, without fear of the guides clogging with membrane material. For example, the ends of the guides 56 may approach as close as a few millimetres from the plane of the orifice 54. This is particularly advantageous for membraning rod of plastics material, since such rod tends to bend, especially if it has been wound off from a storage drum, and no centring can be applied to the emerging coated rod for fear of damaging the membrane.

We claim:

1. A method of manufacturing a membrane assembly for reverse osmosis apparatus, which method comprises the steps of forming a rod with at least one longitudinally extending groove therein, feeding said rod continuously through a machine for covering the rod with a fibrous permeable substrate in the form of a sleeve, feeding said covered rod continuously through a casting head whereby said covered rod is coated with a reverse osmosis membrane coating solution, continuously treating the coating as it emerges from the casting head to remove the solvent therein and provide a hardened reverse osmosis membrane, and cutting the continuously emerging covered and membraned rod into lengths for assembly into reverse osmosis apparatus.

2. A method of manufacturing a membrane assembly for reverse osmosis apparatus, which method comprises the steps of extruding plastic material to form a rod with at least one longitudinally extending groove therein, feeding said rod continuously through a braiding machine for covering the rod with a sleeve of braided fibre, feeding said covered rod continuously through a casting head whereby said covered rod is coated with a reverse osmosis membrane coating solution, passing the coated covered and membraned rod continuously from the casting head into a cold leaching bath to remove the solvent in said coating and provide a hardened reverse osmosis membrane, and cutting the continuously emerging covered and membraned rod into lengths for assembly into reverse osmosis apparatus.

3. A method as claimed in claim 2, wherein a plurality of said lengths and a locating disc having a corresponding plurality of channels extending therethrough are mounted with one end of each said length extending through a respective channel in the locating disc, and providing elastomeric sealing means for effecting a seal between each length of rod and the locating disc.

4. A membrane assembly for reverse osmosis apparatus, which assembly comprises a plurality of similar lengths of rod having at least one longitudinally extending groove therein, a permeable substrate in the form of a sleeve covering the lengths of rod, a reverse osmosis membrane coated on the permeable substrate, there being an opening providing for direct communication with the groove in each said length of rod, a locating disc having a plurality of channels extending therethrough, each length of rod being mounted with one end extending through a channel in the locating disc, and elastomeric sealing means for effecting a seal between each length of rod and the locating disc.

5. A membrane assembly as claimed in claim 4, wherein the elastomeric sealing means comprises a moulded elastomeric material of design matching that of the locating disc.

6. A membrane assembly as claimed in claim 3, wherein the elastomeric sealing means comprises elastomeric material moulded around the lengths of rod in situ so as to penetrate into the spaces between the lengths of rods and the locating disc.

7. A membrane assembly as claimed in claim 6, wherein an end fitting is provided comprising a cylindrical member having a first bore in which is received the combination of said lengths of rod, said locating disc and moulded elastomeric seal sealingly engaging the wall of the bore, which communicates with a second bore providing an outlet for product water, or other product liquid, from the assembly when in use in reverse osmosis apparatus.

8. A membrane assembly as claimed in claim 7, wherein the end fitting is provided with a thrust support member against which abut the ends of the lengths of rod projecting through the locating disc, the thrust support member being channelled to provide a passageway for product liquid to pass from where it emerges from the ends of the lengths of rod into the said outlet for product liquid.

* * * * *